(12) United States Patent
Philp et al.

(10) Patent No.: US 7,797,087 B2
(45) Date of Patent: Sep. 14, 2010

(54) METHOD AND APPARATUS FOR SELECTIVELY DISABLING TRAIN LOCATION REPORTS

(75) Inventors: Joseph Wesley Philp, Indialantic, FL (US); Mitchell Scott Wills, Melbourne, FL (US); Darren Griffith, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 1263 days.

(21) Appl. No.: 11/342,875

(22) Filed: Jan. 31, 2006

(65) Prior Publication Data

US 2006/0212190 A1    Sep. 21, 2006

Related U.S. Application Data

(63) Continuation-in-part of application No. 10/785,059, filed on Feb. 25, 2004, now abandoned.

(60) Provisional application No. 60/449,849, filed on Feb. 27, 2003.

(51) Int. Cl.
*B61B 12/00* (2006.01)
*B61B 1/00* (2006.01)
*G05D 1/00* (2006.01)
*G06F 17/00* (2006.01)

(52) U.S. Cl. .................. 701/19; 701/117; 701/207; 104/26.1; 104/307

(58) Field of Classification Search ............ 701/19, 701/117, 207; 705/6; 703/8; 104/26.1, 307
See application file for complete search history.

(56) References Cited

U.S. PATENT DOCUMENTS

| | | | |
|---|---|---|---|
| 3,575,594 | A | 4/1971 | Elcan |
| 3,734,433 | A | 5/1973 | Metzner |
| 3,794,834 | A | 2/1974 | Auer, Jr. et al. |
| 3,839,964 | A | 10/1974 | Gayot |
| 3,895,584 | A | 7/1975 | Paddison |

(Continued)

FOREIGN PATENT DOCUMENTS

CA         2057039      12/1990

(Continued)

OTHER PUBLICATIONS

Crone, et al., "Distributed Intelligent Network Management for the SDI Ground Network," IEEE, 1991, pp. 722-726, MILCOM '91.

(Continued)

*Primary Examiner*—Thomas G Black
*Assistant Examiner*—Christine M Behncke
(74) *Attorney, Agent, or Firm*—Duane Morris LLP

(57) ABSTRACT

A scheduling system and method for moving plural objects through a system described as a freight railway scheduling system. The scheduling system utilizes a cost reactive resource scheduler to minimize resource exception while at the same time minimizing the global costs associated with the solution. The achievable movement plan can be used to assist in the control of, or to automatically control, the movement of trains through the system. Train location reports used in the automatic updating of the movement plans are selectively disabled for individual trains as a function of the activity scheduled for that train.

9 Claims, 1 Drawing Sheet

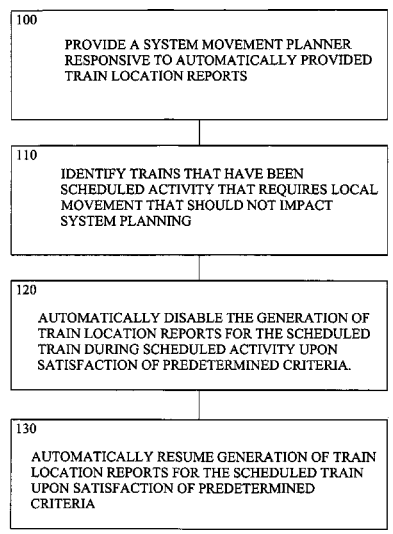

U.S. PATENT DOCUMENTS

| | | | |
|---|---|---|---|
| 3,944,986 A | 3/1976 | Staples |
| 4,099,707 A | 7/1978 | Anderson |
| 4,122,523 A | 10/1978 | Morse et al. |
| 4,361,300 A | 11/1982 | Rush |
| 4,361,301 A | 11/1982 | Rush |
| 4,610,206 A | 9/1986 | Kubala et al. |
| 4,669,047 A | 5/1987 | Chucta |
| 4,791,871 A | 12/1988 | Mowll |
| 4,843,575 A | 6/1989 | Crane |
| 4,883,245 A | 11/1989 | Erickson, Jr. |
| 4,926,343 A | 5/1990 | Tsuruta et al. |
| 4,937,743 A | 6/1990 | Rassman et al. |
| 5,038,290 A | 8/1991 | Minami |
| 5,063,506 A | 11/1991 | Brockwell et al. |
| 5,177,684 A | 1/1993 | Harker et al. |
| 5,222,192 A | 6/1993 | Shafer |
| 5,229,948 A | 7/1993 | Wei et al. |
| 5,237,497 A | 8/1993 | Sitarski |
| 5,265,006 A | 11/1993 | Asthana et al. |
| 5,289,563 A | 2/1994 | Nomoto et al. |
| 5,311,438 A | 5/1994 | Sellers et al. |
| 5,331,545 A | 7/1994 | Yajima et al. |
| 5,332,180 A | 7/1994 | Peterson et al. |
| 5,335,180 A | 8/1994 | Takahashi et al. |
| 5,365,516 A | 11/1994 | Jandrell |
| 5,390,880 A | 2/1995 | Fukawa et al. |
| 5,420,883 A | 5/1995 | Swensen et al. |
| 5,437,422 A | 8/1995 | Newman |
| 5,463,552 A | 10/1995 | Wilson et al. |
| 5,467,268 A | 11/1995 | Sisley et al. |
| 5,487,516 A | 1/1996 | Murata et al. |
| 5,541,848 A | 7/1996 | McCormack et al. |
| 5,623,413 A | 4/1997 | Matheson et al. |
| 5,745,735 A | 4/1998 | Cohn et al. |
| 5,786,998 A * | 7/1998 | Neeson et al. ............ 701/35 |
| 5,794,172 A | 8/1998 | Matheson et al. |
| 5,823,481 A | 10/1998 | Gottschlich |
| 5,825,660 A | 10/1998 | Cagan et al. |
| 5,828,979 A | 10/1998 | Polivka et al. |
| 5,850,617 A | 12/1998 | Libby |
| 6,032,905 A | 3/2000 | Haynie |
| 6,115,700 A | 9/2000 | Ferkinhoff et al. |
| 6,125,311 A | 9/2000 | Lo |
| 6,144,901 A | 11/2000 | Nickles et al. |
| 6,154,735 A | 11/2000 | Crone |
| 6,250,590 B1 | 6/2001 | Hofestadt et al. |
| 6,351,697 B1 | 2/2002 | Baker |
| 6,377,877 B1 | 4/2002 | Doner |
| 6,393,362 B1 | 5/2002 | Burns |
| 6,405,186 B1 | 6/2002 | Fabre et al. |
| 6,459,965 B1 | 10/2002 | Polivka et al. |
| 6,587,764 B2 | 7/2003 | Nickles et al. |
| 6,637,703 B2 | 10/2003 | Matheson et al. |
| 6,654,682 B2 | 11/2003 | Kane et al. |
| 6,766,228 B2 | 7/2004 | Chirescu |
| 6,789,005 B2 | 9/2004 | Hawthorne |
| 6,799,097 B2 | 9/2004 | Antelo et al. |
| 6,799,100 B2 | 9/2004 | Burns |
| 6,853,889 B2 | 2/2005 | Cole |
| 6,856,865 B2 | 2/2005 | Hawthorne |
| 7,006,796 B1 | 2/2006 | Hofmann et al. |
| 2002/0173887 A1* | 11/2002 | Flick ............ 701/29 |
| 2003/0105561 A1 | 6/2003 | Nickles et al. |
| 2003/0183729 A1 | 10/2003 | Root et al. |
| 2004/0010432 A1 | 1/2004 | Matheson et al. |
| 2004/0034556 A1 | 2/2004 | Matheson et al. |
| 2004/0093196 A1 | 5/2004 | Hawthorne |
| 2004/0093245 A1* | 5/2004 | Matheson et al. ............ 705/7 |
| 2004/0267415 A1 | 12/2004 | Lacote et al. |
| 2005/0107890 A1 | 5/2005 | Minkowitz et al. |
| 2005/0192720 A1 | 9/2005 | Christie et al. |
| 2006/0074544 A1 | 4/2006 | Morariu et al. |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 4/1990 |
| WO | WO 93/15946 | 8/1993 |

OTHER PUBLICATIONS

Ghedira, "Distributed Simulated Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

100 PROVIDE A SYSTEM MOVEMENT PLANNER RESPONSIVE TO AUTOMATICALLY PROVIDED TRAIN LOCATION REPORTS

110 IDENTIFY TRAINS THAT HAVE BEEN SCHEDULED ACTIVITY THAT REQUIRES LOCAL MOVEMENT THAT SHOULD NOT IMPACT SYSTEM PLANNING

120 AUTOMATICALLY DISABLE THE GENERATION OF TRAIN LOCATION REPORTS FOR THE SCHEDULED TRAIN DURING SCHEDULED ACTIVITY UPON SATISFACTION OF PREDETERMINED CRITERIA.

130 AUTOMATICALLY RESUME GENERATION OF TRAIN LOCATION REPORTS FOR THE SCHEDULED TRAIN UPON SATISFACTION OF PREDETERMINED CRITERIA

FIGURE 1

METHOD AND APPARATUS FOR SELECTIVELY DISABLING TRAIN LOCATION REPORTS

RELATED APPLICATIONS

This application is a continuation in part of application Ser. No. 10/785,059 filed Feb. 25, 2004, claiming the benefit of U.S. Provisional Application 60/449,849 filed on Feb. 27, 2003.

This application is also one of the below listed applications being concurrently filed:

GEH01 00166 application Ser. No. 11/342,856 entitled "Scheduler and Method for Managing Unpredictable Local Trains";

GEH01 00167 application Ser. No. 11/342,855 entitled "Method And Apparatus For Optimizing Maintenance Of Right Of Way";

GEH01 00168 application Ser. No. 11/342,853 entitled "Method and Apparatus for Coordinating Railway Line-Of-Road and Yard Planners";

GEH01 00170 application Ser. No. 11/342,854 entitled "Method And Apparatus For Automatic Selection Of Train Activity Locations";

GEH01 00171 application Ser. No. 11/342,874 entitled "Method And Apparatus For Congestion Management";

GEH01 00172 application Ser. No. 11/342,857 entitled "Method And Apparatus For Automatic Selection of Alternate Routing Through Congested Areas Using Congestion Prediction Metrics; and";

GEH01 00173 application Ser. No. 11/342,816 entitled "Method and Apparatus for Estimating Train Location".

The disclosure of each of the above referenced applications including those concurrently filed herewith is hereby incorporated herein by reference.

BACKGROUND OF THE INVENTION

The present invention relates to the scheduling of movement of plural units through a complex movement defining system, and in the embodiment disclosed, to the scheduling of the movement of freight trains over a railroad system, particularly the selective disabling of train location reports.

Systems and methods for scheduling the movement of trains over a rail network have been described in U.S. Pat. Nos. 6,154,735, 5,794,172, and 5,623,413, the disclosure of which is hereby incorporated by reference.

As disclosed in the referenced patents and applications, the complete disclosure of which is hereby incorporated herein by reference, railroads consist of three primary components (1) a rail infrastructure, including track, switches, a communications system and a control system; (2) rolling stock, including locomotives and cars; and, (3) personnel (or crew) that operate and maintain the railway. Generally, each of these components are employed by the use of a high level schedule which assigns people, locomotives, and cars to the various sections of track and allows them to move over that track in a manner that avoids collisions and permits the railway system to deliver goods to various destinations.

As disclosed in the referenced applications, a precision control system includes the use of an optimizing scheduler that will schedule all aspects of the rail system, taking into account the laws of physics, the policies of the railroad, the work rules of the personnel, the actual contractual terms of the contracts to the various customers and any boundary conditions or constraints which govern the possible solution or schedule such as passenger traffic, hours of operation of some of the facilities, track maintenance, work rules, etc. The combination of boundary conditions together with a figure of merit for each activity will result in a schedule which maximizes some figure of merit such as overall system cost.

As disclosed in the referenced applications, and upon determining a schedule, a movement plan may be created using the very fine grain structure necessary to actually control the movement of the train. Such fine grain structure may include assignment of personnel by name as well as the assignment of specific locomotives by number and may include the determination of the precise time or distance over time for the movement of the trains across the rail network and all the details of train handling, power levels, curves, grades, track topography, wind and weather conditions. This movement plan may be used to guide the manual dispatching of trains and controlling of track forces, or provided to the locomotives so that it can be implemented by the engineer or automatically by switchable actuation on the locomotive.

The planning system is hierarchical in nature in which the problem is abstracted to a relatively high level for the initial optimization process, and then the resulting course solution is mapped to a less abstract lower level for further optimization. Statistical processing is used at all levels to minimize the total computational load, making the overall process computationally feasible to implement. An expert system is used as a manager over these processes, and the expert system is also the tool by which various boundary conditions and constraints for the solution set are established. The use of an expert system in this capacity permits the user to supply the rules to be placed in the solution process.

Of significant value in planning train movement is the evaluating of the current location of the train, i.e., is the train on, ahead or behind schedule. Train location reports may be automatically issued by sensors along the line of road and are required to be submitted by train personnel at periodic intervals. The information in these reports as to the location of a train is used to automatically update the planned movement of the trains.

Currently, when a train stops to perform an activity such as a pickup, setout or crew change, some or part of the train (e.g., locomotive or selected cars) may be required to make movements along the track to accomplish the activity. This is true both in terminals and on the line of road. Such activity related moves typically do not advance the train along its route. Because the movement of the train may be automatically sensed and fed to the movement planner, significant disruption of the planning process may result. For example, the passage of a train by a switch in one direction may result in an automatic request for authority to use the adjacent section of track, with significant disruption of the planning function when the train is a short time later detected passing the same switch going in the opposite direction and automatically generates a request for authority to use an entirely different section of track.

One current solution is to prevent any impact on the movement planner by such train location information by the suspension of the use of the movement planner altogether in congested areas where long-haul, local industry or yard trains typically perform activities. This deprives the dispatcher of information as to the location of all trains in the area, including those trains which are not performing local movements, and represents a serious disadvantage in planning the movement of such trains.

An alternative current solution is the designation by the dispatcher of a specific train for manual operation when it approaches such an area. This deprives the dispatcher of the use of computerized planning tools and represents an unjustified allocation of the attention of the dispatcher.

It is accordingly an object of the present invention to permit the dispatcher to have continued access to the movement planner for those trains not engaged in local movements and to avoid manual intervention for such trains, thereby improving the profitability of the overall transportation system.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWING

FIG. 1 is a simplified flow chart illustrating one embodiment of the selective disabling of train location reports.

DETAILED DESCRIPTION

With reference to FIG. 1, a movement plan may be provided by identifying the activities required to move plural trains through a network of track, by assigning resources to each of the identified activities, and by creating a movement plan optimizing movement of the trains through the system as a function of cost of the identified activities and assigned resources. The movement planner automatically receives train location reports communicated from certain trackside equipment or provided by on board equipment such as a conventional geolocation system, and, unless disabled, uses all available train location information to update the movement plan for the entire system 100.

When a specific train has been scheduled to perform local movement activities such a pickup, setout, engine work, power change, crew change or mishap recovery which do not advance the train along the planned line of road, that train is identified to the movement planner as a local movement train the tactical positioning of which can not be allowed to disrupt the movement plan for the system 110.

For example, a trackside sensor may detect the passage of an identifiable train at a known location and automatically provide the movement planner with information as to the current location of the train. The detection by the sensor may also automatically initiate a request for authorization to use the immediately adjacent section of track in the direction in which the identified train is moving.

While it is not practical to disable the trackside sensor, it is practical to disable the use by the movement planner of any train location information related to a train that has been scheduled for an activity requiring local movement 120. The order to disable the movement planner may be automatically initiated by the detected location of the train at or near the location at which the activity is to be performed. It may also be manually initiated by the dispatcher.

Upon satisfaction of some criteria, the automatic generation of train location reports can resume 130. The responsiveness of the movement planner to train location reports may be resumed by the detection of train location beyond the location at which the activity was scheduled, the elapse of the period of time in which the activity was scheduled to be performed, or by the crew directly or through the dispatcher.

Because the auto-routing of trains that have not been scheduled for local movement is not affected, the present method and system has significant advantages over the disabling of train location reports for a geographic area. Manual intervention for non-local movement trains is not required and the attention of the dispatcher is not diverted as would be the case where the specifically identified trains were kept under the manual control of the dispatcher.

The method of automatically disabling train location reports for trains engaged in local movement activities can be implemented using computer usable medium having a computer readable code executed by special purpose or general purpose computers.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a railway scheduling system in which each resource used in each scheduled activity has an incremental cost associated with it, and in which train location reports are automatically provided to the scheduler as an aid in the updating the schedule of a train along a planned line of road, a method of selectively disabling train location reports comprising:
    (a) assigning a local movement activity which does not advance a train along the planned line of road to a selected train at a selected location;
    (b) detecting a location of the selected train using a trackside sensor;
    (c) automatically providing a location report of the selected train to the scheduler; and
    (d) automatically disabling the use of the provided train location report by the scheduler for the selected train as a function of the distance of the train from the selected location.

2. The method of claim 1 wherein the local movement activity is one of a pickup, setout, engine work, power change, crew change or mishap recovery.

3. The method of claim 1 further comprising automatically resuming the use of train location reports by the scheduler for the selected train as a function of elapsed time.

4. The method of claim 1 further comprising automatically resuming the use of train location reports by the scheduler for the selected train as a function of the distance of the selected train from the selected location.

5. In a railroad system in which plural trains are moved along a network of railway tracks under control of a dispatcher assisted by a scheduling computer prepared movement plan that assigns resources to activities and considers the cost of each activity and assigned resources in scheduling the movement of trains along a planned line of road,
    and in which information as to the location of trains is automatically provided to the movement planner by trackside sensors for use in modifying the movement plan for the system,
    the improvement comprising the step of disabling the use of train location information by the scheduling computer for trains that have been assigned activities that require local movement which do not advance the train along the planned line of road.

6. A computer program product for controlling the movement of plural trains along a planned line of road, the computer program product comprising:
    a computer usable medium having computer readable program code modules embodied in said medium for selectively disabling train location reports;
    a computer readable first program code module for assigning a local movement activity which do not advance the train along the planned line of road to a selected train at a selected location;

a computer readable second program code module for detecting a location of the selected train using a trackside sensor;

a computer readable third program code module for automatically providing a location report of the selected train to the scheduler; and a computer readable fourth program code module for automatically disabling the use of the provided train location report by the scheduler for the selected train as a function of the distance of the train from the selected location.

7. The computer program product of claim 6 wherein the local movement activity is one of a pickup, setout, engine work, power change, crew change or mishap recovery.

8. The computer program product of claim 6 further comprising a computer readable fifth program code module for automatically resuming the use of train location reports by the scheduler for the selected train as a function of elapsed time.

9. The computer program product of claim 6 further comprising a computer readable fifth program code module for automatically resuming the use of train location reports by the scheduler for the selected train as a function of the distance of the selected train from the selected location.

\* \* \* \* \*